United States Patent [19]

Winship

[11] Patent Number: 5,052,657

[45] Date of Patent: Oct. 1, 1991

[54] BALL VALVE

[75] Inventor: Thomas E. Winship, Houston, Tex.

[73] Assignee: Shaw Industries, Ltd., Rexdale, Canada

[21] Appl. No.: 609,189

[22] Filed: Nov. 2, 1990

[51] Int. Cl.$^5$ .......................... F16K 5/06; F16K 25/00
[52] U.S. Cl. ..................................... 251/160; 166/324; 251/172; 251/174; 251/283; 251/315; 251/316
[58] Field of Search ................ 137/629; 251/282, 283, 251/160, 172, 174, 180, 315, 316, 317; 166/324

[56] References Cited

U.S. PATENT DOCUMENTS

| 3,542,335 | 11/1970 | Scaramucci | 251/317 |
|---|---|---|---|
| 3,667,505 | 6/1972 | Radig | 137/629 |
| 3,741,249 | 6/1973 | Leutwyler | 166/324 |
| 3,826,462 | 7/1974 | Taylor | 166/324 |
| 3,850,242 | 11/1974 | Crowe | 166/324 |
| 3,868,995 | 3/1975 | Crowe | 137/629 |
| 3,901,321 | 8/1975 | Mott | 251/160 |
| 3,993,136 | 11/1976 | Mott | 166/324 |
| 4,103,744 | 8/1978 | Akkerman | 166/324 |
| 4,423,749 | 1/1984 | Schmitt | 251/315 |
| 4,448,216 | 5/1984 | Speegle et al. | 166/324 |

Primary Examiner—George L. Walton
Attorney, Agent, or Firm—Dodge, Bush, Moseley & Riddle

[57] ABSTRACT

A kelly valve includes a ball valve structure (10) having a ball valve member (40) with a central bore (42) therethrough mounted within a valve chamber (38) for rotation between open and closed positions. A fluid pressure equalizing opening or port (60) is provided in the quadrant of the ball valve member (40) exposed to the upstream flow passage (20) in closed position (FIG. 2) and exposed to the valve chamber (38) in open position (FIG. 1) thereby making the ball valve member (40) easy to rotate manually even at high downstream fluid pressures.

3 Claims, 1 Drawing Sheet

BALL VALVE

BACKGROUND OF THE INVENTION

1. Field of the Invention

This invention relates to ball valves, and more particularly to ball valves having means for equalizing fluid pressure between the flow line and the valve body chamber.

2. Description of the Prior Art

Heretofore, when floating ball valves have been utilized in flow lines having relatively high flow line pressures, it has sometimes been difficult to rotate the ball valve member to a closed position. Annular pressure actuated seats are normally provided on opposite sides of the rotatable ball valve member and a differential fluid pressure area results in the annular seats being forced toward the ball valve member to grip or squeeze the ball valve member tightly therebetween. Because a fluid tight seal is normally provided between the surface of the ball valve member and the annular seats, there is no leakage of fluid from the flow line to the valve chamber in the open and closed positions of the ball valve member.

The higher the flow line pressure, the tighter the annular seals are forced into contact with the ball valve member. Thus, particularly when manually operated under high fluid pressures, such as 4,000 or 5,000 psi, manual rotation of the ball valve member from open position to closed position is very difficult, and practically impossible if relatively large differential fluid pressure areas are provided at very high fluid pressures.

If the flow line and ball valve are used for drilling mud in a drilling operation, such as a kelly or downhole valve, very high backflow pressures can result from a blowout or the like. For safety reasons, it is desirable that a ball valve can be easily rotated manually to a closed position under the application of very high fluid pressure.

When used as a kelly valve, a ball valve in the closed position may have extremely high pressure applied to the bottom side of the ball. Prior art ball valves have been extremely difficult to open for pressure control procedures due to the bottom side pressure acting to pinch the valve seats against the ball.

SUMMARY OF THE INVENTION

This invention concerns a ball valve having a floating ball valve member and fluid pressure actuated annular seal members engaging the floating ball valve member. The ball valve member is mounted within a valve chamber in the valve body for a quarter turn rotation of 90° between open and closed positions. The fluid pressure in the body chamber acts against the annular seal members in a direction opposite the flow line pressure. If fluid pressure in the body chamber is equalized with the flow line fluid pressure, the sealing members are pressure balanced and are forced by spring members into sealing engagement with the ball valve member. Thus, the ball valve member may be easily rotated manually between open and closed positions.

The present invention relates to a ball valve having a stop to limit the rotation of the ball valve member to a quarter turn or 90° for movement between fully open and fully closed positions of the ball valve member relative to the flow line passage.

The ball valve member has a central bore through it. A pressure equalizing opening or hole extends from the central bore through the body of the ball valve. Such hole is provided in the quadrant of the ball valve member exposed to upstream fluid pressure in the closed position so that upstream fluid pressure is in fluid communication with the valve chamber through the bore of the ball valve member.

When the ball valve member is in the open position, flow line pressure is communicated through the pressure equalizing opening to the ball valve chamber. Accordingly, when the ball valve member is in open position, fluid pressure acting against the annular seal member is balanced or substantially balanced to permit the ball valve member to be rotated manually, even at very high fluid pressures, such as 4,000 psi. In the closed position, a fluid pressure may be applied from the upstream side of the closed ball valve member to offset the downstream fluid pressure and permit manual opening of the ball valve member even at extremely high downstream fluid pressures.

It is an object of this present invention to provide a ball valve having a ball valve member mounted for rotation between open and closed positions and having means to equalize the fluid pressure between the flow line passage and the valve chamber to permit manual rotation of the ball valve member to the closed position, even at high flow line pressures.

It is a further object of this invention to provide such a ball valve in which fluid balancing means are provided for the closed position of the ball valve member to permit manual rotation of the ball valve member to an open position upon the application of a high upstream fluid pressure even at a high downstream fluid pressure.

Other objects, features, and advantages of this invention will become more apparent after referring to the following specification and drawing.

DESCRIPTION OF THE INVENTION

Figure 1:
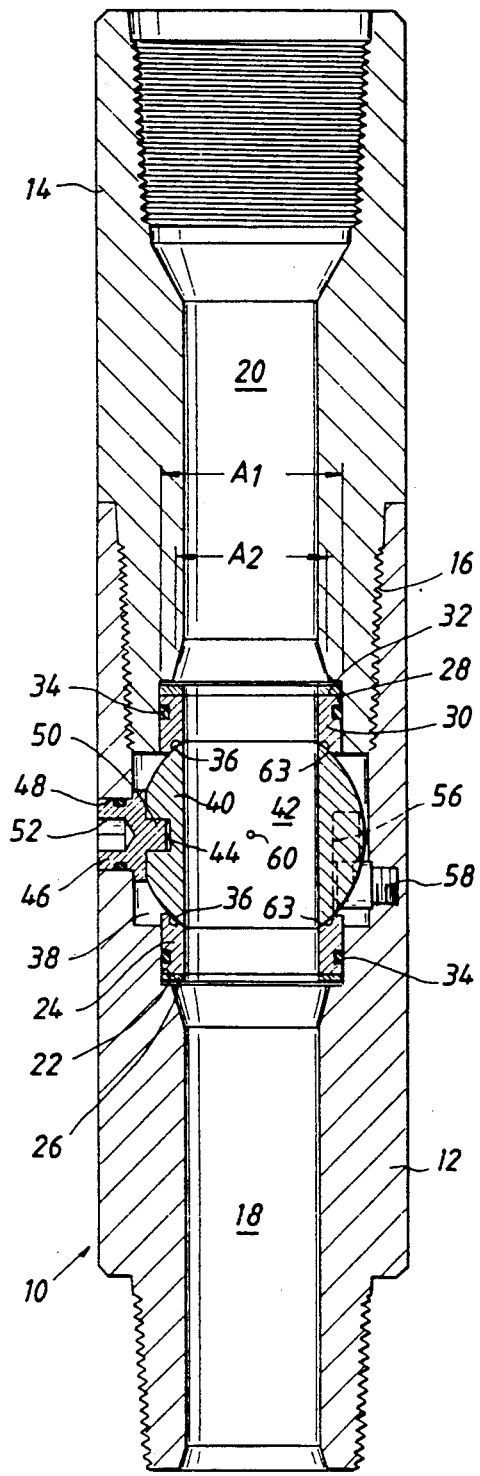
FIG. 1 is a cross-sectional view of the ball valve of the invention showing the ball valve member in an open position.

Referring now to the drawings the present invention is shown used as a lower kelly valve. A kelly is the drive connection between a drill string and surface drilling equipment for rotation of the drill string. Kelly valves are generally placed above and below the kelly to provide pressure protection for the kelly and surface equipment. When a high pressure "kick" of subsurface gas enters the drill string, it is necessary to manually turn the kelly valve to a closed position for the protection of the surface equipment.

The lower kelly valve comprises a ball valve shown generally at 10. A lower sub or housing 12 receives an upper sub or housing 14 threaded to each other at 16. A lower downstream flow line passage 18 is formed by lower sub 12 and an upper upstream flow line passage 20 is formed by upper sub 14. Lower housing 12 has an annular groove or pocket 22 receiving a downstream annular seat 24 forced outwardly by a Belleville spring 26. Upper housing 14 has an annular groove or pocket 28 which receives an upstream annular seat 30 forced outwardly by Belleville spring 32. Annular resilient seals 34 seal about the outer periphery of annular seats 24 and 30 and annular face seals 36 extend about the inner faces of seats 24 and 30 for sealing against ball 40.

An enlarged annular valve chamber 38 is defined by housing 12. A ball valve member generally indicated at 40 is mounted within chamber 38 for rotation within chamber 38. Ball valve member 40 has a generally spherical body with a central bore 42 through it forming a flow passage in line with flow passages 18 and 20. Bore 42 has the same diameter as flow passages 18 and 20.

An outer surface of ball valve member 40 has an elongate slot 44 extending at right angles to the longitudinal axis of bore 42 when the valve is in the open position. Such slot is in a direction parallel to the longitudinal axis of flow passages 18 and 20 when the valve is in the closed position of ball valve member 40.

A stem generally indicated at 46 fits within an opening 48 in lower housing 12 and has a rectangular lug 50 fitting within slot 44. A flat sided opening 52 in stem 46 is adapted to receive the extending end of a wrench 54 for manual rotation of ball valve member 40 between open (FIG. 1) and closed (FIG. 2) positions. The outer surface of ball valve member 40 has an arcuate groove 56 in it which receives a stop 58 secured to housing 12 for limiting rotation of ball valve member 40 to a quarter turn or 90°.

As shown by dimensions A1 and A2, a fluid pressure differential area exists between the area indicated at A1 acting to force seats 24 and 30 against ball valve member 40 and the area indicated at A2 acting to force seats 24 and 30 away from ball valve member 40. When a high flow line pressure is applied against seats 24 and 30 in the open position shown in FIG. 1, seats 24 and 30 will be forced tightly against the outer surface of ball valve member 40 to make it difficult to rotate ball valve member 40 to a closed position.

Figure 2:
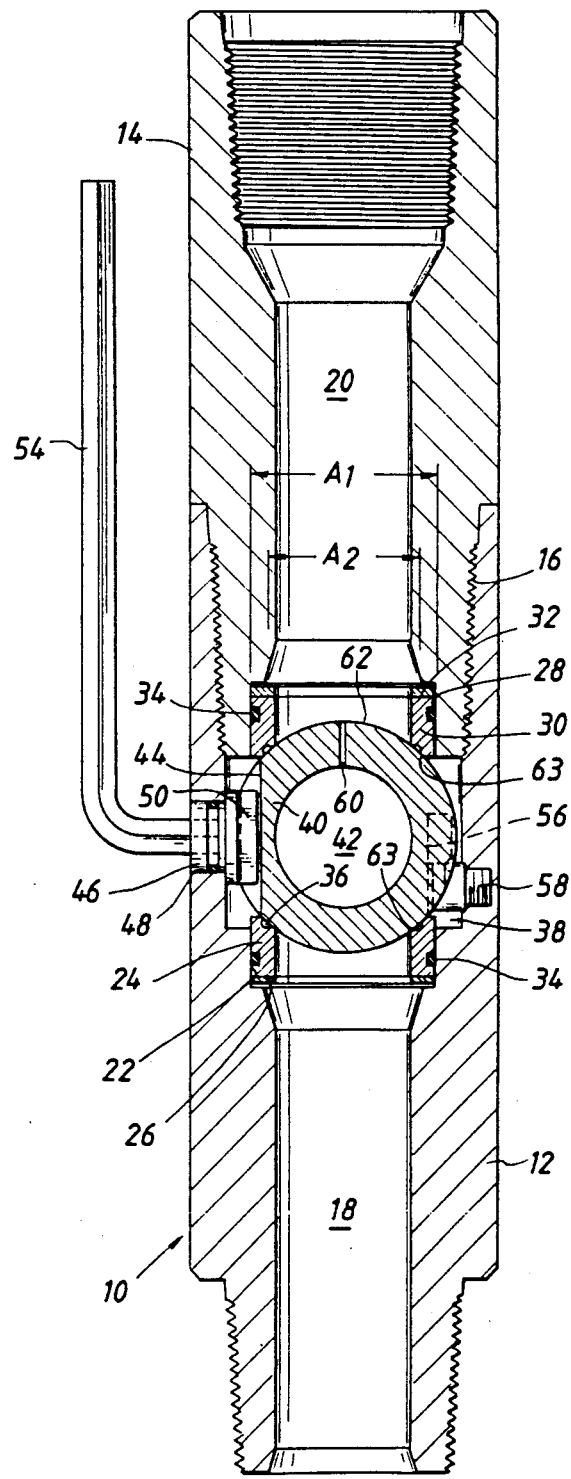
FIG. 2 is a sectional view of the ball valve of FIG. 1 but showing the ball valve member in a closed position and engaged by a manual wrench for manual rotation of the ball valve member between open and closed positions.

In the closed position of ball valve member 40 as shown in FIG. 2, seat 24 will be forced tightly against ball valve member 40 from the downstream high fluid pressure in passage 18. The fluid pressure in chamber 38 is normally substantially less than the flow line pressure because seals 34 and 36 prevent or minimize any leakage of fluid to the body chamber 38 from passages 18 and 20.

To equalize or substantially equalize the fluid pressure acting on the opposed faces of seats 24 and 30, a small fluid equalizing opening hole or port 60 of about ⅛ inch in diameter extends from bore 42 through the body portion of ball valve member 40 which is exposed to fluid pressure from the upstream flow passage in the closed position of the ball valve member 40. The outer surface or quadrant 62 of ball valve member 40 circumscribed by or within the confines of seat 30 as shown in FIG. 2 is exposed to fluid pressure from upstream flow passage 20.

In the open position of ball valve member 40 shown in FIG. 1, flow line pressure is communicated through opening 60 to valve chamber 38 to act against the faces of seats 24 and 30 exposed to fluid pressure from chamber 38 thereby to equalize the pressure acting on seats 24 and 30.

In the closed position of FIG. 2 in which the downstream or bore hole pressure is controlled by ball valve 10, a suitable flapper check valve (not shown) may be installed upstream of upper sub 14. Fluid can be pumped downwardly by surface equipment through such check valve and against ball valve member 40. Fluid passes through opening 60 to valve chamber 38 for acting against face 63 of downstream seat 24 exposed to fluid pressure from chamber 38 to permit ball valve member 40 to be easily rotated to an open position.

Ball valve 10 may be easily assembled by first inserting spring 26 and seat 24 within pocket 22. Stem 46 with lug 50 is then inserted within opening 48. Ball valve member 40 is inserted with lug 50 being received within slot 44. In this position, upper housing 14 with spring 32 and seat 30 inserted in pocket 28 is threaded within lower housing 12.

While a preferred embodiment of the present invention has been illustrated, it is apparent that modifications and adaptations of the preferred embodiment will occur to those skilled in the art. However, it is to be expressly understood that such modifications an adaptations are within the spirit and scope of the present invention as set forth in the following claims.

What is claimed is:

1. In a lower kelly valve positioned beneath the kelly of a drill string connected to surface drilling equipment and mounted between an internally threaded lower tubular member defining a downstream flow passage and an interfitting externally threaded upper tubular member defining an upstream flow passage; an improved ball valve structure comprising:

an enlarged valve chamber formed in said lower tubular member and having an annular groove therein adjacent said valve chamber and extending about said downstream flow passage;

a ball valve member mounted in said valve chamber for rotation between open and closed positions relative to said flow passage;

an annular downstream seat mounted in said annular groove for sealing against said ball valve member;

resilient means urging said downstream seat toward sealing engagement with said ball valve member;

an annular groove in said upper tubular member adjacent said valve chamber and extending about said upstream flow passage;

an annular upstream seat mounted in said annular groove of said upper tubular member for sealing against said ball valve member;

resilient means urging said upstream seat toward sealing engagement with said ball valve member;

said ball valve member having a generally spherical body with a central bore therethrough and a fluid equalizing opening extending in the closed position of said ball valve member from said central bore through said body to said upstream flow passage to provide fluid communication from the upstream flow passage to said valve chamber to permit equalizing the fluid pressure acting on said annular seats in said closed position from upstream fluid pressure thereby to provide equal seating forces between said ball valve member and said annular upstream and downstream seats for facilitating easy rotation of said ball valve member from said closed position to said open position, said fluid equalizing opening in the open position of said ball valve member being in direct fluid communication with said valve chamber whereby fluid pressure from said flow passages is transmitted to said valve chamber for equalizing the fluid pressure acting on said annular seats; and manual means connected to said ball valve member to rotate said ball valve member between open and closed positions.

2. A lower kelly valve as set forth in claim 1 wherein said equalizing opening is about ⅛ inch in diameter and said ball valve member is mounted for floating movement relative to said annular seats and said tubular housings.

3. A lower kelly valve as set forth in claim 2 wherein said lower tubular member has a laterally extending opening therein in communication with said valve chamber and the surface of said ball valve member adjacent said laterally extending opening has an elongate slot therein extending in a direction parallel to the longitudinal axis of the flow passages in the closed position of the ball valve member;

a stem extends through said laterally extending opening and has a lug on its inner end fitting within said elongate slot; and a manually actuated handle is connected to said stem for rotation of said ball valve member between open and closed positions.

* * * * *